United States Patent
Jitsukata et al.

(10) Patent No.: US 6,169,940 B1
(45) Date of Patent: *Jan. 2, 2001

(54) AUTOMATIC DRIVING SYSTEM

(75) Inventors: Eishi Jitsukata; Sachio Kobayashi; Kazuya Tamura, all of Wako (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/145,425

(22) Filed: Sep. 1, 1998

(30) Foreign Application Priority Data

Sep. 3, 1997 (JP) .................................................. 9-238464
Nov. 6, 1997 (JP) .................................................. 9-304645

(51) Int. Cl.⁷ .............................. B62D 13/00; G05D 1/03
(52) U.S. Cl. ............................... 701/23; 701/24; 340/903
(58) Field of Search .................................. 701/23, 24, 25, 701/26, 28, 41, 96, 205, 301; 340/902, 903, 905, 435, 436

(56) References Cited

U.S. PATENT DOCUMENTS

| | | | |
|---|---|---|---|
| 5,295,551 | * 3/1994 | Sukonick | 180/167 |
| 5,331,561 | * 7/1994 | Barrett et al. | 701/205 |
| 5,467,284 | * 11/1995 | Yoshioka et al. | 701/300 |
| 5,483,453 | * 1/1996 | Uemura et al. | 701/28 |
| 5,680,122 | * 10/1997 | Mio | 340/932 |
| 5,764,139 | * 6/1998 | Nojima et al. | 340/461 |
| 5,828,968 | * 10/1998 | Iiboshi et al. | 701/23 |
| 5,913,375 | * 6/1999 | Nishikawa | 180/158 |
| 5,938,707 | * 8/1999 | Uehara | 701/41 |

* cited by examiner

Primary Examiner—Tan Nguyen
(74) Attorney, Agent, or Firm—Arent Fox Kintner Plotkin & Kahn, PLLC (57) ABSTRACT

An automatic driving system which is provided for automatically driving vehicles to follow respective target running trajectories. A running instruction and a running course are set based on an obstacle detecting signal, a vehicle position signal, road data and automatic drive traffic information signals, and a vehicle-to-vehicle running information signal. A running course signal indicative of the running course and a running position setting position signal indicative of a running position of one vehicle at the time the running course is set are transmitted and received between the one vehicle and another vehicle, so that a target running trajectory suitable for each vehicle can be calculated on the basis of the received running course, thereby automatically navigating each vehicle such that the respective vehicles run following the resultant target running trajectories.

3 Claims, 7 Drawing Sheets

AUTOMATIC DRIVING SYSTEM

BACKGROUND OF THE INVENTION

1. Field of the Invention

The present invention relates to an automatic driving system, and more particularly to an automatic driving in a situation where a plurality of vehicles are running together.

2. Description of the Related Background Art

There has been known an automatic driving system for guiding a plurality of vehicles to run as a group along a reference line on a road represented by lane markers such as magnetic nails disposed on the surface of the road. For example, in a system shown in Laid-open Japanese Patent Application No. 8-314541 (1996), a top vehicle among a plurality of vehicles forming a group detects a relative deviation from the vehicle with respect to a reference line, sets a control amount for an automatic navigation based on the relative deviation, and controls the running of itself based on the control amount. Then, the top vehicle transmits the control amount to a subsequent vehicle which sets a modification amount based on the control amount when the subsequent vehicle reaches the position at which the top vehicle has transmitted the control amount thereto, and controls the running of itself based on the modification amount. The subsequent vehicle also transmits the modification amount to its subsequent vehicle, so that each subsequent vehicle controls the running of itself based on a modification amount transmitted thereto from a vehicle which is running immediately in front of itself.

For a solely running vehicle, a vehicle is guided immediately in front of the single vehicle by a base station to form a top vehicle.

In addition, the above-mentioned system detects vehicles to be joined in a group at a junction point of roads, and transmits an increase instruction signal to a subsequent vehicle to increase the distance between itself and a preceding vehicle. Also, the system evaluates a jam condition to transmit a decrease instruction signal to a subsequent vehicle to decrease the distance between itself and a preceding vehicle. As a result, the system enables a control for a group of vehicles.

However, the conventional system as mentioned above is constructed such that drive control signals such as those indicative of the position of a top vehicle, a running trajectory, and a navigation amount are received by a subsequent vehicle, so that the subsequent vehicle follows the same vehicle motions as the top vehicle. Therefore, the subsequent vehicle would follow unstable motions of the top vehicle, if any, due to trouble or the like in a magnetic nail detector equipped in the top vehicle, whereby a group of vehicles would entirely trace an unstable running trajectory.

Figure 1:
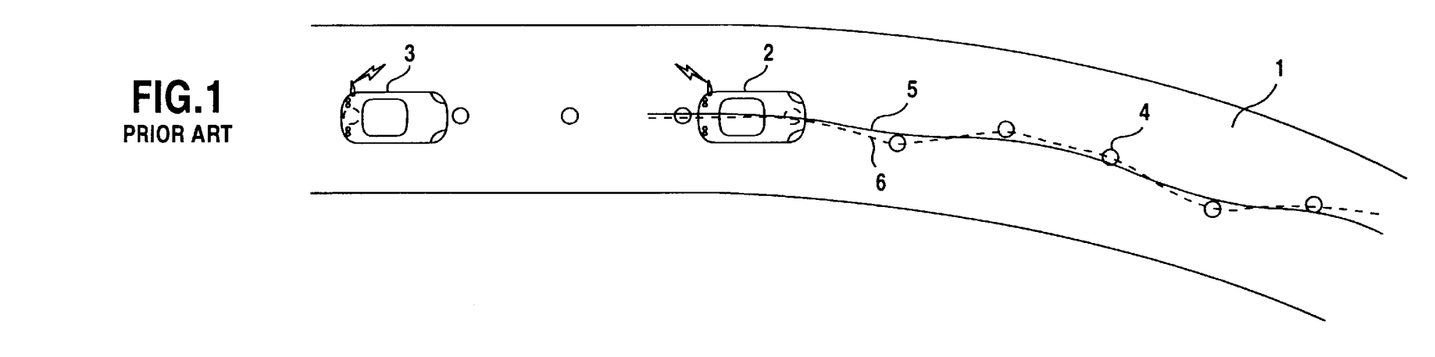
FIG. 1 illustrates an automatic driving operation between vehicles which are equipped with a conventional system.

For example, as illustrated in FIG. 1, when magnetic nails 4 arranged along the center of a lane 1 of a road are not positioned on a smooth curved line along the curvature of the lane 1, a running line 5 on which a vehicle 2 really runs does not draw a smooth curved line in the center of the lane 1. In other words, although the vehicle 2 is run such that a straight line 6 connecting two adjacent magnetic nails matches with the center axis of the vehicle 2, if the vehicle 2 is run to follow the magnetic nails 4 which are not correctly positioned at the center of the road as illustrated in FIG. 1, a running line 5 becomes winding. A vehicle 3, which receives a drive control signal from the vehicle 2 and is automatically driven on the basis of the drive control signal, also follows the winding running line 5, with the result that all of subsequent vehicles will sequentially run along a winding trajectory such as the running line 5.

In addition, assuming the running on a road having a plurality of lanes, if a running vehicle must deviate from a reference line for changing lanes, taking a branch, or the like, the vehicle runs out of a detectable range of a magnetic nail signal, thereby resulting in a failed automatic control for the vehicle.

SUMMARY OF THE INVENTION

It is therefore an object of the present invention to provide an automatic driving system which is capable of achieving appropriate automatic driving for a plurality of vehicles running in a group.

The automatic driving system according to the present invention comprises radar means for detecting an obstacle in front of one vehicle to generate an obstacle detecting signal, imaging means for imaging a road surface in front of the one vehicle to output a video signal, image processing means for generating a vehicle position signal indicative of a position of the one vehicle in a width direction of the road from an image represented by the video signal, a navigation unit for generating road data indicative of the coordinates of a road in front of a current position of the one vehicle, road-to-vehicle communications means for receiving automatic drive traffic information signal, vehicle-to-vehicle communications means for transmitting and receiving a vehicle-to-vehicle running information signal between the one vehicle and at least one different vehicle other than the one vehicle, running instruction generating means for generating a running instruction, running course setting means for setting a running course based on the obstacle detecting signal, the vehicle position signal, the road data, the automatic drive traffic information signal, the vehicle-to-vehicle running information signal and the running instructions, target running trajectory calculating means for calculating a target running trajectory based on the set running course, and vehicle control means for controlling navigation of the one vehicle such that the one vehicle runs following the target running trajectory, wherein the vehicle-to-vehicle communications means transmits a running course signal indicative of the running course, and a running course setting position signal indicative of a running position of the one vehicle at the time the running course is set, thus automatically navigating a plurality of vehicles.

Therefore, the running course signal indicative of a set running course and the running course setting position signal indicative of a running position of the one vehicle at the time the running course is set are transmitted and received between vehicles, and a running target trajectory can be set for each vehicle based on the running course and the running course setting running position from the received signals to carry out automatic navigation. Therefore, subsequent vehicles can maintain smooth navigation suitable therefor even if a preceding vehicle, which has transmitted the signals, is in a running condition in which it is not drawing a smooth curve along a lane.

DESCRIPTION OF THE PREFERRED EMBODIMENTS

Embodiments of the present invention will hereinafter be described in detail with reference to the accompanying drawings.

Figure 2:
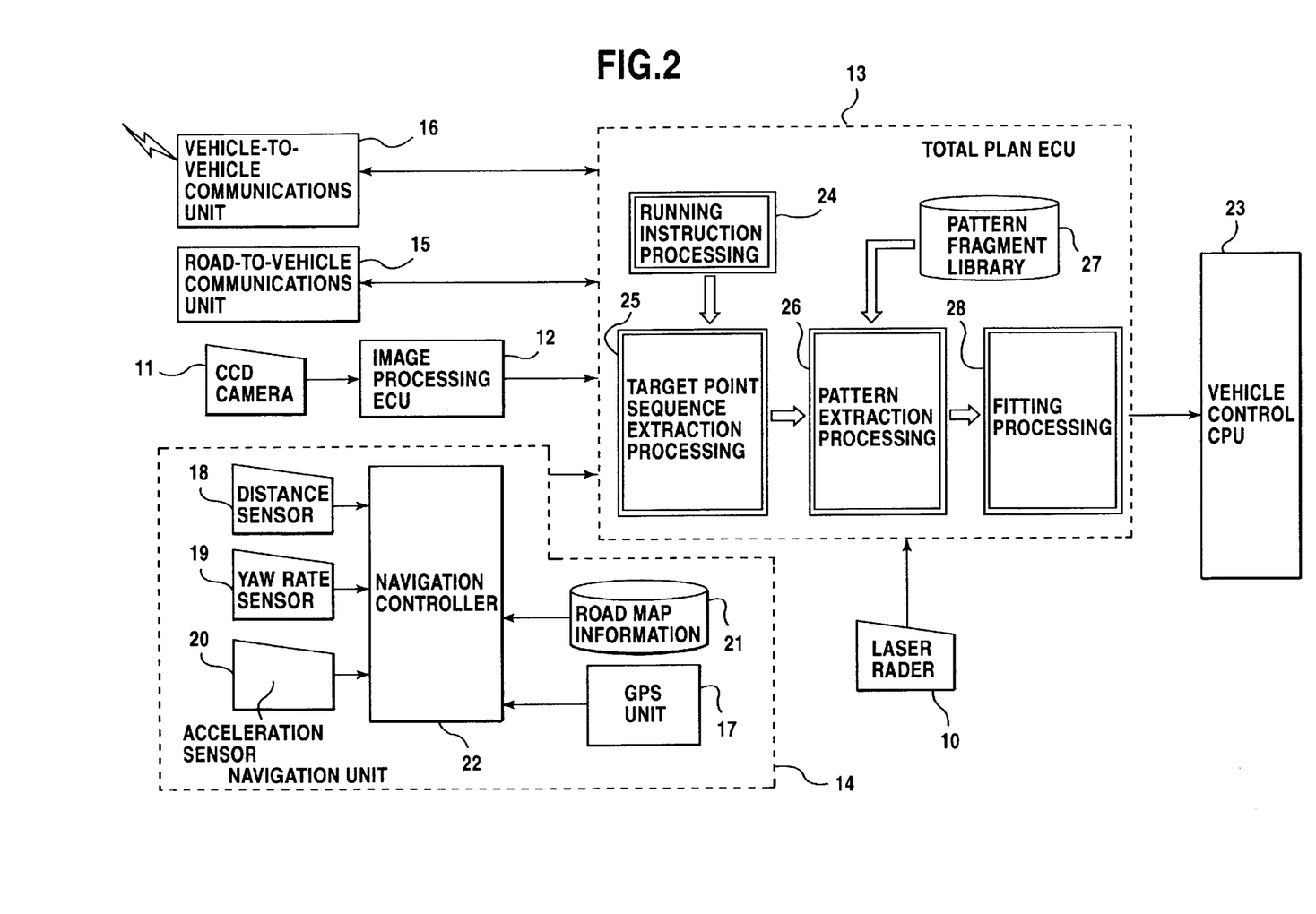
FIG. 2 is a block diagram illustrating the configuration of an automatic driving system according to the present invention.

FIG. 2 illustrates in a block diagram form the configuration of an automatic driving system according to the present invention. This system comprises, in a front portion of a vehicle, not shown, a laser radar 10 for detecting the existence of an obstacle encountered in front of the vehicle, and a CCD (Charge Coupled Device) camera 11 serving as an imaging means for recognizing the form of the surface of a road in front as well as a positional relationship between the vehicle itself and a lane. A video signal produced by the CCD camera 11 is supplied to an image processing ECU (Electric Control Unit) 12. The image processing ECU 12, based on a microcomputer, outputs road surface data and on-lane vehicle position data based on a video signal from the CCD camera 11. Outputs of the laser radar 10 and the image processing ECU 12 are supplied to a total plan ECU 13. The total plan ECU 13 is also supplied with outputs of a navigation unit 14, a road-to-vehicle communications unit 15 and a vehicle-to-vehicle communications unit 16. Here, as the infrastructure for constructing the automatic driving system, beacons totally controlled by a control center are disposed in side regions of the road at predetermined intervals, such that the road-to-vehicle communications unit 15 receives an automatic driving traffic information signal from the beacons. The vehicle-to-vehicle communications unit 16 transmits and receives vehicle-to-vehicle running information signals including a running course signal, a decelerated running signal and so on, later described, between the vehicle in which the communications unit 16 itself is equipped and another vehicle. The navigation unit 14 comprises a GPS (Global Positioning System) unit 17, a distance sensor 18, a yaw rate sensor 19, an acceleration sensor 20, and road map information 21 in which road map data is recorded, and obtains running information through a navigation controller 22. Since the configuration and operation of the navigation unit 14 is well known, detailed explanation thereon is omitted here.

The total plan ECU 13 has capabilities of determining running instructions such as maintaining a lane and changing a lane, through running instruction processing 24 based on information on obstacles in front of the vehicle from the laser radar 10; road information such as road surface conditions within a predetermined distance from the vehicle in the forward direction from the road-to-vehicle communications unit 15; or traffic information such as jam information. It should be noted herein that simultaneous reference to vehicle sensor information (direction, speed, acceleration and so on) and map information from the navigation unit 14 enables the acquisition of more accurate running condition information (allowable speed, allowable forward and backward accelerations, allowable lateral acceleration and so on).

Figure 3:
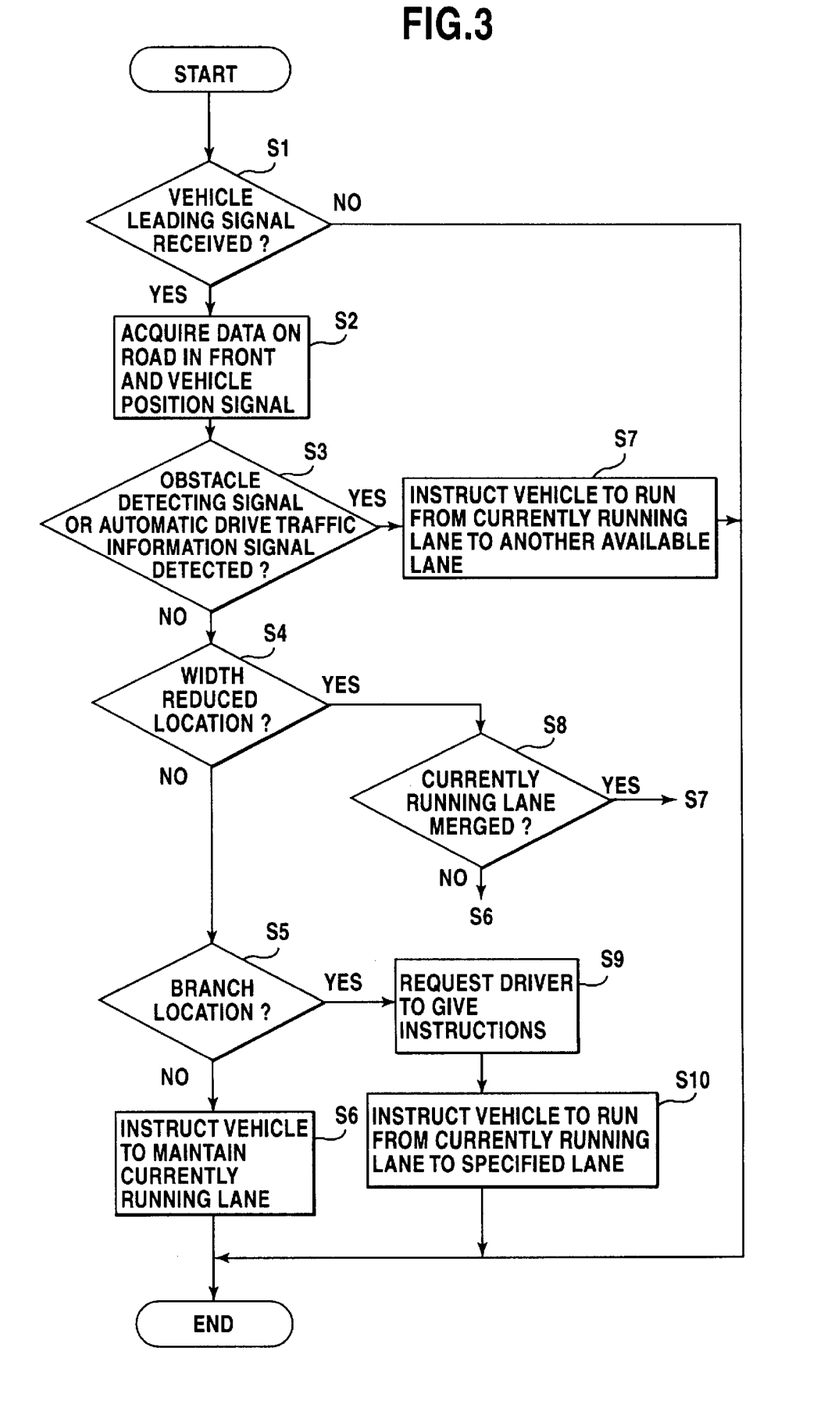
FIG. 3 is a flowchart illustrating running instruction processing executed by a total plan ECU in FIG. 2.

FIG. 3 is a flowchart illustrating processing executed by the total plan ECU 13 to issue running instructions. Referring specifically to FIG. 3, the total plan ECU 13 determines whether it has received a vehicle leading signal indicating that this vehicle equipped with the total plan ECU 13 is a vehicle running at the top of a vehicle group (hereinafter referred to as the "leading vehicle") by a setting operation of a driver through an input device such as a keyboard, not shown, and stored the vehicle leading signal in a predetermined memory (not shown) in the total plan ECU 13 (step S1). At step S1, if the total plan ECU 13 has not received a vehicle leading signal, the running instruction processing is terminated. Conversely, if the total plan ECU 13 has received a vehicle leading signal at step S1, the total plan ECU 13 acquires data on a road in front of the leading vehicle (for example, in a range of 100 meters ahead from the leading vehicle) from the navigation unit 14, and a vehicle position signal from the image processing ECU 12 (step S2). The total plan ECU 13 obtains information on the road within all possible regions where the vehicle is likely to reach and pass through, by running from a current position. Next, the total plan ECU 13 detects any obstacles in accordance with a obstacle detecting signal supplied from the laser radar 10, or retrieves signals, for example, indicative of the presence or absence of an accident and, if any, the location of the accident, and so on in accordance with an automatic drive traffic information signal received by the road-to-vehicle communications unit 15 (step S3), and instructs the vehicle to travel from the currently running lane to another lane on which the vehicle can avoid these obstacles or the accident (step S7). In the detection of obstacles, the total plan ECU 13 may detect a vehicle running immediately in front at a low speed with a reduced distance therebetween as an obstacle.

At step S3, if any signal indicative of obstacles or accident is not detected, the total plan ECU 13 determines whether or not the running vehicle will encounter a width-reduced portion of the road based on the road data and the vehicle position signal supplied thereto at step S2 (step S4). Determining at step S4 that the vehicle will encounter a width-reduced portion, the total plan ECU 13 determines whether or not the currently running lane will be merged into an adjacent lane at the width reducing location (step S8). Determining at step S8 that the currently running lane will be merged into an adjacent lane, the total plan ECU 13 executes the operation at step S7, and otherwise, the total plan ECU 13 instructs the vehicle to maintain the currently running lane (step S6). If no width-reduced location is detected at step S4, the total plan ECU 13 determines whether a branch location is encountered (step S5). If a branch location is detected at step S5, the total plan ECU 13 prompts the driver for instructions as to which of branch lanes to take, or whether the currently running lane is maintained (step S9). Then, the total plan ECU 13 instructs the vehicle to run from the currently running lane to a lane specified by the driver (step S10). If no branch location is confirmed at step S5, the total plan ECU 13 instructs the vehicle to maintain the currently running lane (step S6).

When the vehicle is directing to a junction, the total plan ECU 13 executes the running instructions at the foregoing step S6 without instructing the vehicle to change lanes.

As the running instructions are issued by the running instruction processing 24 as described above, the total plan ECU 13 again extracts information related to the determined running instructions within a range of information which has been relied on by the running instruction processing 24 to determine the running instructions (for example, within a range of the aforementioned predetermined distance, i.e., 100 meters ahead from the vehicle), acquires the position of the vehicle in the width direction of the road through the CCD camera 11, and sets a sequence of points which serves as a running course within the information range that extends from the current position of the vehicle as a starting point to a running target location as an end point by target point sequence extraction processing 25. At this time, a running course signal indicative of the set running course and a running course setting position signal indicative of the running position of the vehicle at the time when the running course is set, are transmitted from the vehicle-to-vehicle communications unit 16 to another vehicle.

It should be noted that a target running trajectory or a parameter defining the target running trajectory may be transmitted instead of the running course signal.

Further alternatively, the road-to-vehicle communications unit 15 may be used instead of the vehicle-to-vehicle communications unit 16.

Turning back to step S1 in FIG. 3, if the total plan ECU 13 does not receive the vehicle leading signal, the vehicle-to-vehicle communications unit 16 receives from another vehicle a running course signal indicative of a sequence of points serving as a running course, and a running course setting position signal indicative of the running position of the other vehicle at the time the other vehicle set the running course. Then, if it is determined through running position determination processing, not shown, that this vehicle with the total plan ECU 13 has reached a running position indicated by the running course setting position signal received thereby, the running course or the sequence of points indicated by the received running course signal is regarded as the aforementioned sequence of points which would be produced if the vehicle leading signal was received. The received running course signal and running course setting position signal are simultaneously transmitted to another vehicle which is different from the other vehicle.

In an alternative, the system may be provided with a means (not shown) for sensing a manual navigation instruction from the operator in the running instruction processing 24 to determine the running instructions in response to this navigation instruction.

Pattern extraction processing 26 and fitting processing 28 determine a target running trajectory based on the sequence of points produced by the target point sequence extraction processing 25 when this vehicle with the total plan ECU 13 contains the vehicle leading signal indicating that the vehicle is a leading vehicle. If the total plan ECU 13 does not contain the vehicle leading signal indicating that this vehicle is a leading vehicle, the processing 26, 28 determines a target running trajectory based on a sequence of points produced by a running course signal received from another vehicle, instead of the sequence of points from the target point sequence processing 25. The total plan ECU 13 transmits a vehicle navigation signal based on the resultant target running trajectory to a vehicle control ECU 23. The configuration and operation of a portion for producing the vehicle navigation signal in accordance with the resultant target running trajectory are similar to a prior art example as disclosed, for example, in Laid Open Japanese Patent Application No. 9-62346 (1997), so that detailed explanation thereon is herein omitted.

Figure 4:
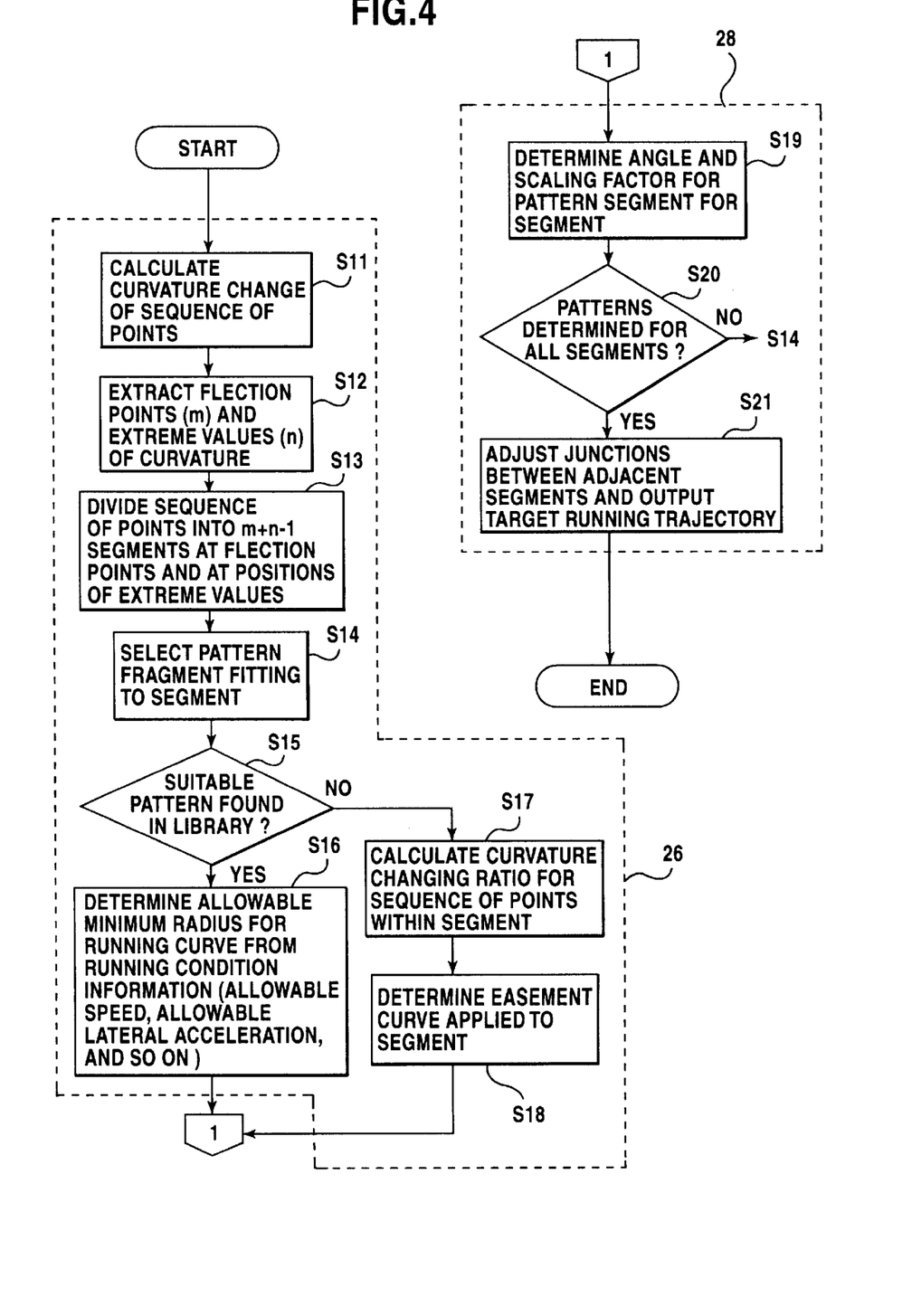
FIG. 4 is a flowchart illustrating pattern processing and fitting processing executed by the total plan ECU in FIG. 2.

FIG. 4 is a flowchart illustrating the pattern extraction processing 26 and the fitting processing 28 executed by the total plan ECU 13. Referring specifically to FIG. 4, the total plan ECU 13 first calculates the curvature in each sequence of points from a curve formed by connecting the points in the produced sequence (step S11). From the result of step S1, the total plan ECU 13 extracts extreme values (n) of the curvature and inflection points (m) of the curve (step S12). It should be noted that in this embodiment, the starting point and the end point of the sequence of points are also included in inflection points. Next, the total plan ECU 13 divides the sequence of points into m+n−1 segments based on the results at step S12 (step S13). Then, the total plan ECU 13 selects a pattern fragment of the shape conformal with or fitting to each segment from a pattern fragment library 27 (step S14). The pattern fragment library 27 serves as a means for storing basic elements such as straight line, arc and so on, as well as road patterns including U- and S-shaped patterns, right/left lane change patterns, junctions, branches and so on, each composed of the basic elements. If a pattern fragment suitable for a segment is found as a result of the processing at step S14 (step S15), the total plan ECU 13 determines a minimum allowable radius of a curve, along which the vehicle can run, from the running condition information which has been relied on by the running instruction processing 24 to determine the running instructions. If the pattern fragment selected at step S14 includes a curve, the shape of the pattern fragment is finely adjusted such that the curvature radius of the curve is equal to or larger than the minimum allowable radius (step S16). At step 15, if the total plan CPU 13 does not find any pattern fragment fitting to the segment in the pattern fragment library 27, the total plan CPU 13 calculates a curvature changing ratio for a sequence of points within the segment (step S17), and determines an easement curve suitable for the segment (step S18). Step S18 involves the processing for deriving an averaged curvature change of the sequence of points, for example, by a least square method to determine a parameter for clothoid (Cornu's spiral).

Next, the total plan CPU 13 determines the angle and scaling factor for the pattern fragment selected in correspondence to the segment to fit the pattern fragment to an actual road on which the vehicle is running (step S19). The total plan CPU 13 repeats the foregoing processing for all segments (step S20), finely adjusts again the angle and scaling factor for each of the pattern fragments such that tangential directions of the respective adjacent segments are coincident at their junctions, joins the pattern fragments, and outputs a set target running trajectory (step S21).

A vehicle navigation signal is formed on the basis of the target running trajectory output by the processing of the total plan ECU 13 so far described, and the resultant vehicle navigation signal is supplied to the vehicle control ECU 23. The vehicle control ECU 23 outputs control signals to a throttle actuator, a brake actuator and a steeling actuator, not shown, respectively, to automatically drive the vehicle.

In the embodiment described above, when a vehicle leading signal exists to indicate that a vehicle equipped with the total plan ECU 13 is a leading vehicle, the execution of the running instruction processing 24 and the target point sequence extraction processing 25 is skipped in the total plan ECU 13 equipped in the vehicle. Alternatively, the running instruction processing 24 and the target point sequence extraction processing 25 may be executed irrespective of the presence or absence of the vehicle leading signal. In this case, a sequence of points produced by the target point sequence extraction processing 25 is selected when the vehicle leading signal exists, and a sequence of points produced by a running course signal received from another vehicle is selected when no vehicle leading signal exists so that the vehicle is not indicated to be a leading vehicle, followed by setting a target running trajectory based on the selected sequence of points.

Figure 5:
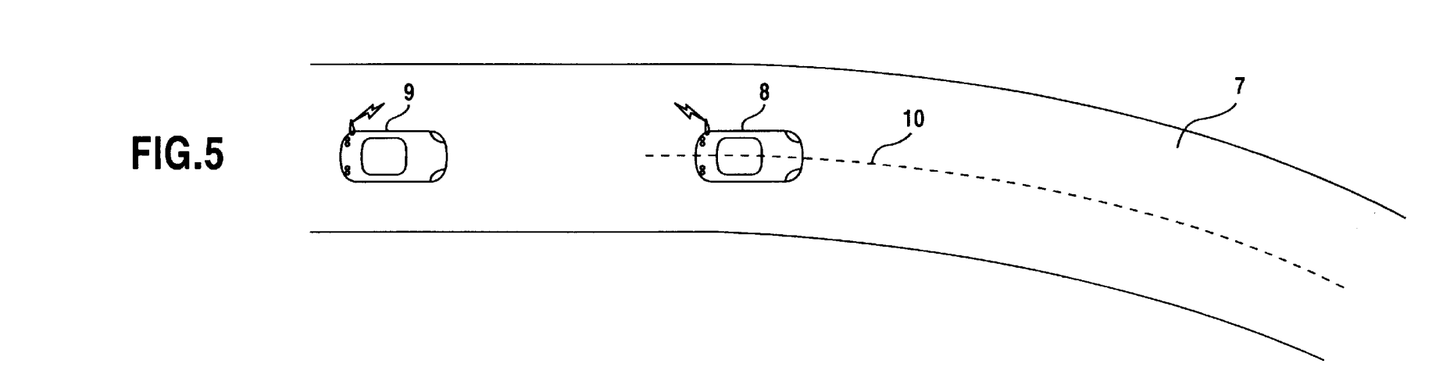
FIG. 5 illustrates an automatic driving operation between vehicles equipped with the system according to the present invention.

As illustrated in FIG. 5, a vehicle 8 equipped with the automatic driving system according to the present invention sets a target running trajectory 10 through the aforementioned processing of the total plan ECU 13, when receiving a vehicle leading signal indicative of a leading vehicle in a group including a plurality of vehicles running on the same lane, so that the vehicle 8 is steered to draw a smooth running trajectory in a central portion of a lane 7 of a road.

Further, another vehicle (hereinafter referred to as the "subsequent vehicle") 9 following the vehicle 8 receives a running course signal and a running course setting position signal from the vehicle 8 which has become a leading vehicle (hereinafter referred to the "leading vehicle 8"), through the vehicle-to-vehicle communications unit 16. When the subsequent vehicle 9 reaches the position indicated by the running course setting position signal, after receiving those signals, the subsequent vehicle 9 sets a target running trajectory based on the running course signal received from the leading vehicle 8 to run along a running trajectory suitable for the subsequent vehicle 9 and current running conditions (speed, acceleration, orientation and so on). The set target running trajectory is output to the vehicle control ECU 23 which outputs control signals to a throttle actuator, a brake actuator and a steering actuator, not shown, based on the target running trajectory for automatic vehicle driving.

As described above, the subsequent vehicle 9 sets a target running trajectory suitable therefor based on a running course 10 set by the leading vehicle 8, and performs automatic navigation along the target running trajectory. It is therefore possible to trace a smooth running trajectory along a lane without depending on the position of the aforementioned lane markers.

Figure 6:
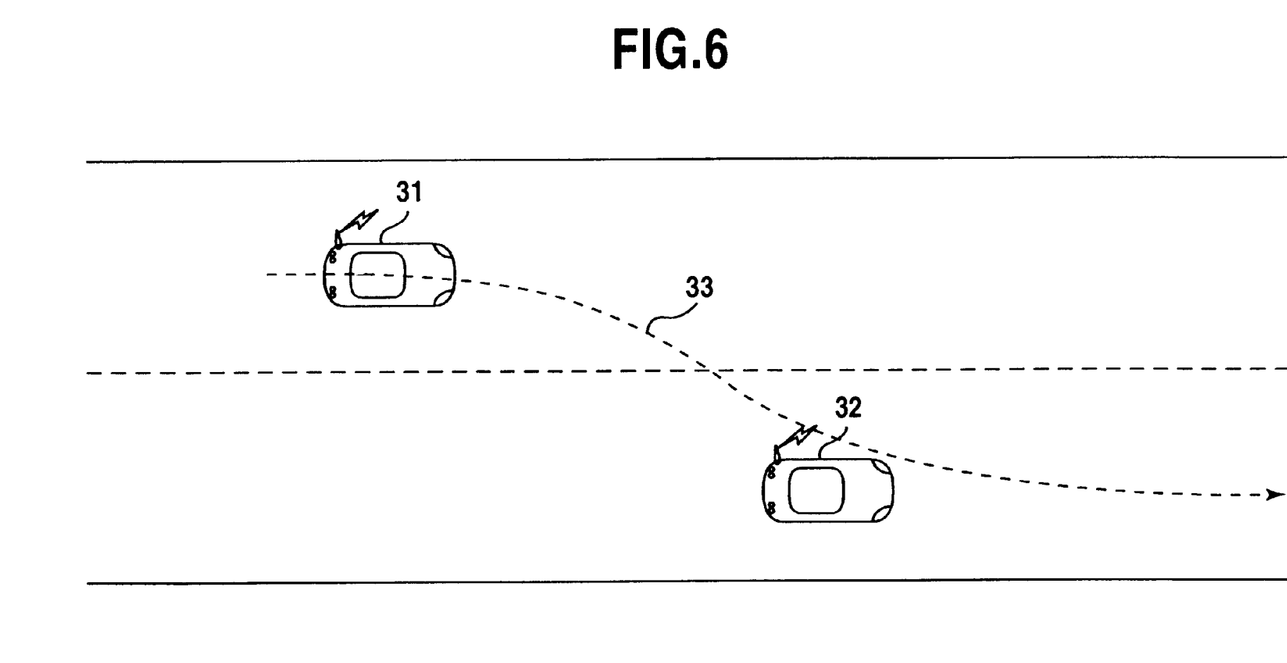
FIG. 6 illustrates another automatic driving operation between vehicles equipped with the system according to the present invention.
Figure 7:
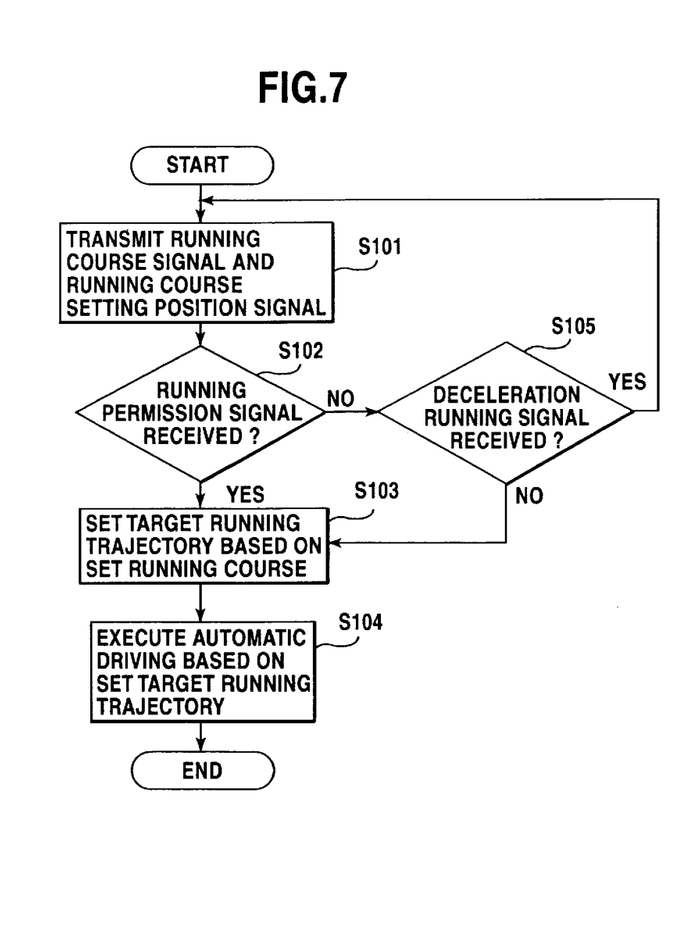
FIG. 7 is a flowchart illustrating the operation of a leading vehicle 31 in FIG. 6.
Figure 8:
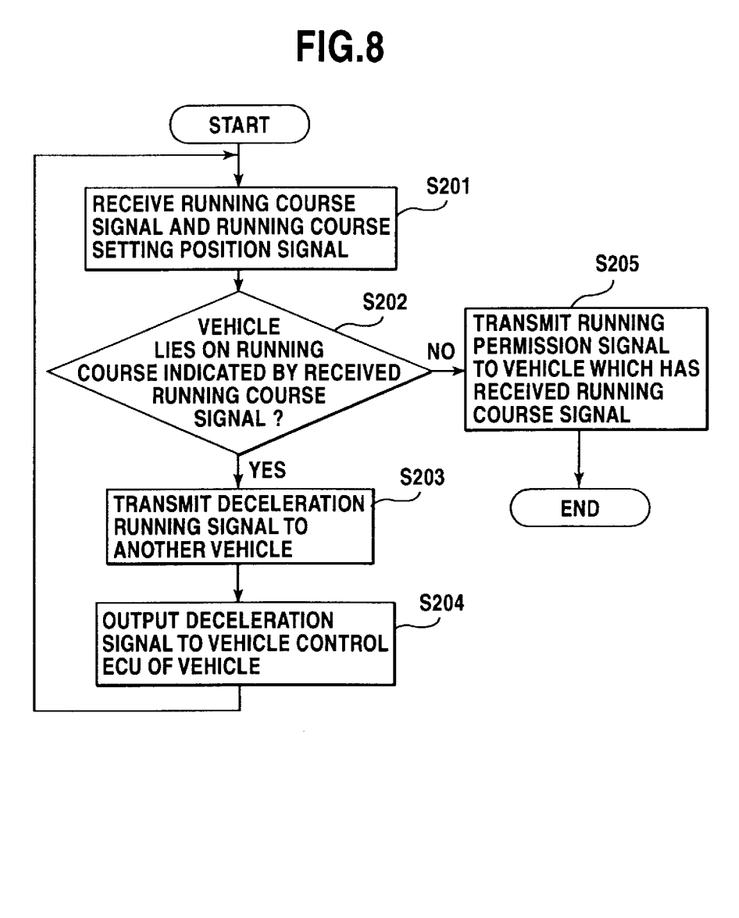
FIG. 8 is a flowchart illustrating the operation of a subsequent vehicle 32 in FIG. 6.

FIG. 6 illustrates an example of a automatic driving operation between vehicles on a load that has a plurality of lanes. FIGS. 7 and 8 are flowcharts for describing the operation of a vehicle 31 and a vehicle 32 in FIG. 6, respectively.

In the following, the operation of the vehicle 31 will be described first with reference to FIG. 7. The vehicle 31 first determines a running instruction for changing to the right lane, and sets a running course based on the determined running instruction. In this stage, the vehicle 31 transmits a running course signal indicative of the set running course, and a running course setting position signal indicative of the position of the vehicle 31 at the time the running course has been set, to the vehicle 32 through the vehicle-to-vehicle communications unit 16 (step S101). The vehicle 31 next determines whether or not a running permission signal has been received from the vehicle 32, indicating that the running based on the set running course can be executed (step S102). If the vehicle 31 has received the running permission signal at step S102, the vehicle 31 sets a target running trajectory based on the running course (step S103), and executes automatic driving based on the set target running trajectory (step S104). If the vehicle 31 has not received the running permission signal at step 102, the vehicle 31 next determines whether or not a deceleration running signal has been received from the vehicle 32, indicating that the vehicle 32 is decelerating (step S105). If the vehicle 31 has received the deceleration running signal from the vehicle 32, the vehicle 31 again sets a running course, and repeats again the processing from step S101. Specifically, after receiving the deceleration running signal from the vehicle 32, the vehicle 31 repeats the foregoing steps (S101, S102, S105) until it receives the running permission signal indicative of a condition in which the vehicle 31 is permitted to run along the set running course.

If the vehicle 31 does not receive the deceleration running signal at step S105, for example, if the vehicle 32 is running out of a range of the running course set by the vehicle 31 and out of a range in which the vehicle 32 can receive the running course signal, in other words, if the vehicle 32 is running out of a range in which it cannot transmit a running permission signal or the deceleration running signal while the vehicle 31 can run along the set running course, the processing at step S103 and step S104 is executed.

Next, the operation of the vehicle 32 will be described with reference to FIG. 8. The vehicle 32 first receives a running course signal and a running course setting position signal from the vehicle 31 (step S201). Next, the vehicle 32 determines whether or not the vehicle 32 lies on a running course indicated by the received running course signal (step S202). At step S202, if the running position of the vehicle 32 is on the running course indicated by the running course signal, i.e., if the vehicle 32 is running at any position on the running course set by the vehicle 31, the vehicle 32 transmits a deceleration running signal to the vehicle 31, indicating that the vehicle 32 is decelerating (step S203). Then, the vehicle 32 outputs a deceleration signal to the vehicle control ECU 23 thereof to execute deceleration running (step S204). If the vehicle 32 is followed by subsequent vehicles running the same lane as the vehicle 32, the vehicle 32 transmits the deceleration running signal to those subsequent vehicles, thereby executing the deceleration running for the entire group of vehicles running on the same lane as the vehicle 32, with the vehicle 32 behaving as a leading vehicle.

At step S202, if the running position of the vehicle 32 is not on the running course indicated by the received running course signal, i.e., if the vehicle 32 is not running at any position on the running course set by the vehicle 31, the vehicle 32 transmits a running permission signal to the vehicle 31, indicating that the vehicle 31 can execute running based on the running course (step S205).

As described above, cooperative running can be achieved by making communications based on the running course signal between vehicles running on a road having a plurality of lanes.

In the foregoing embodiment, the transmission and reception of signals between vehicles are all performed through the vehicle-to-vehicle communications unit 16. While the running course signal, running course setting position signal, deceleration running signal and running permission signal are enumerated as signals transmitted and received by the vehicle-to-vehicle communications unit 16, signals indicative of speed, acceleration, orientation and so on, associated with the currently running vehicle, may also be included therein other than those signals.

Figure 9:
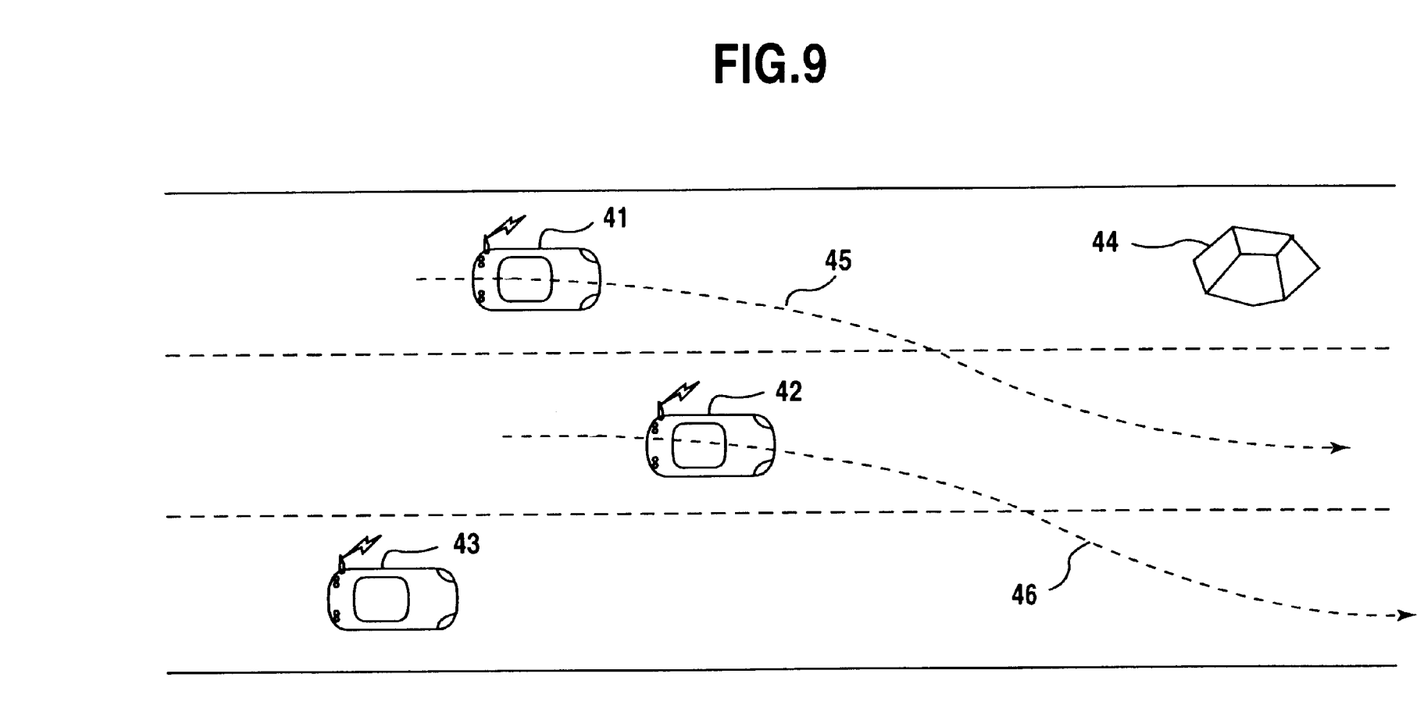
FIG. 9 illustrates another automatic driving operation between vehicles equipped with the system according to the present invention.

FIG. 9 illustrates an automatic driving operation among a plurality of vehicles when an emergency avoidance is required on a road having a plurality of lanes, for example, when an obstacle is found in front of a vehicle. Referring specifically to FIG. 9, a vehicle 41 detects an obstacle 44 in front thereof, and determines a running instruction for changing the lane. Next, the vehicle 41 determines a running course 45 based on the running instruction, and transmits a running course signal indicative of the running course 45, and a running course setting position signal indicative of the position of the vehicle 41 at the time it determines the running course 45 to a vehicle 42 through the vehicle-to-vehicle communications unit 16. A subsequent cooperative operation between the vehicle 41 and the vehicle 42 can be corresponded to the cooperative operation between the vehicle 31 and the vehicle 32 described above with reference to FIG. 6, so that detailed description thereon is omitted here. However, the deceleration running signal at step S105 in FIG. 7 and at step S203 in FIG. 8 may be replaced by a running course signal indicative of a running course 46 in FIG. 9. In this event, by transmitting the running course signal indicative of the running course 46 set by the vehicle 42 further to a vehicle 43, the vehicle 31 and the vehicle 32 in the foregoing cooperative operation described above with reference to FIG. 6 can be corresponded to the vehicle 42 and the vehicle 43, respectively. It is therefore possible to perform a cooperative running among a plurality of vehicles running on different lanes for changing their respective lanes.

It goes without saying that in FIG. 9, each of the vehicles 41, 42 and 43 becomes a leading vehicle for a group of vehicles running on the same lane, so that the aforementioned operation illustrated in FIG. 5 is applied to subsequent vehicles following the respective leading vehicles.

It should be noted that the laser radar 10, the CCD camera 11, the image processing ECU 12, the road-to-vehicle communications unit 15, the vehicle-to-vehicle communications unit 16, the running instruction processing 24, and the target point sequence extraction processing 25 correspond to radar means, imaging means, image processing means, road-to-vehicle communications means, vehicle-to-vehicle communications means, running instruction generating means, and running course setting means, respectively. Also, the pattern extraction processing 26 and the fitting processing 28 correspond to target running trajectory calculating means.

According to the automatic driving system of the present invention as described above, a running course is set based on an obstacle detecting signal, a vehicle position signal, road data, an automatic drive traffic information signal and a running instruction, and a target running trajectory can be calculated on the basis of the set running course signal, so that a vehicle is automatically steered to follow the calculated target running trajectory. In addition, a running course signal indicative of the set running course can be transmitted from a leading vehicle and received by a subsequent vehicle. The subsequent vehicle derives a target running trajectory based on the running course signal received from the leading vehicle, and is automatically steered to follow the resultant target running trajectory, so that the subsequent vehicle can maintain smooth running suitable therefor based on the received running course signal, even if the leading vehicle, which has transmitted the signal, is in a running condition in which the leading vehicle is not drawing a smooth curve along a lane.

In addition, a cooperative driving can be achieved between a plurality of vehicles running on a plurality of lanes by transmitting and receiving a running course signal indicative of a set running course among the vehicles.

What is claimed is:

1. An automatic driving system comprising:

radar means for detecting an obstacle in front of one vehicle to generate an obstacle detecting signal;

imaging means for imaging a road surface in front of said one vehicle to output a video signal;

image processing means for generating a vehicle position signal indicative of a position of said one vehicle in a width direction of the road from an image represented by the video signal;

a navigation unit for generating road data indicative of the coordinates of a road in front of a current position of said one vehicle;

road-to-vehicle communications means for receiving automatic drive traffic information signal;

vehicle-to-vehicle communications means for transmitting and receiving a vehicle-to-vehicle running information signal between said one vehicle and at least one different vehicle other than said one vehicle;

running instructions generating means for generating a running instruction;

running course setting means for setting a running course based on said obstacle detecting signal, said vehicle position signal, said road data, said automatic drive traffic information signal, said vehicle-to-vehicle running information signal, and said running instruction; and vehicle control means for controlling navigation of said one vehicle such that said one vehicle runs following a target running trajectory based on said set running course, wherein said vehicle-to-vehicle communications means transmits a running course signal indicative of said running course, and a running course setting position signal indicative of a running position of said one vehicle at the time said running course is set.

2. An automatic driving system according to claim 1, wherein said running course setting means newly sets said running course when a deceleration running signal indicating that the different vehicle is decelerating is received as said vehicle-to-vehicle running information signal by said vehicle-to-vehicle communications means.

3. An automatic driving system according to claim 1, wherein said vehicle control means executes driving control based on the set running course when a running permission signal indicating permission of running based on the set running course is received as said vehicle-to-vehicle running information signal by said vehicle-to-vehicle communications means.

* * * * *